United States Patent [19]

Fukano et al.

[11] Patent Number: 5,333,647
[45] Date of Patent: Aug. 2, 1994

US005333647A

[54] MANIFOLD VALVE

[75] Inventors: Yoshihiro Fukano; Shoichi Makado; Yoshitada Doi, all of Soka, Japan

[73] Assignee: SMC Corporation, Tokyo, Japan

[21] Appl. No.: 95,988

[22] Filed: Jul. 23, 1993

Related U.S. Application Data

[63] Continuation of Ser. No. 813,687, Dec. 27, 1991, abandoned.

[30] Foreign Application Priority Data

Dec. 29, 1990 [JP] Japan .................. 2-417645

[51] Int. Cl.$^5$ .............................................. F15B 13/08
[52] U.S. Cl. .................................... 137/884; 137/271; 137/596.16
[58] Field of Search ............... 137/271, 596.16, 884

[56] References Cited

U.S. PATENT DOCUMENTS 2,958,547 11/1960 Batts et al. .
3,888,518 6/1975 Delessert ................. 137/271 X
4,247,133 1/1981 Moller .................... 137/271 X
4,392,677 7/1983 Hardouin ................. 137/271 X
4,815,496 3/1989 Nishitani et al. ............. 137/884

FOREIGN PATENT DOCUMENTS 1211453 2/1966 Fed. Rep. of Germany .
2654930 6/1977 Fed. Rep. of Germany ...... 137/884
3-29785 3/1991 Japan .
3-29786 3/1991 Japan .
1136259 12/1968 United Kingdom .

OTHER PUBLICATIONS

Energie Fluide, vol. 28, No. 7, Nov. 1989, pp. 40-43, S.M.C. Pneumatique S.A., "Evolution Dans le Montage et la Connectique des Distributeurs Directionnels Pneumatiques".

Primary Examiner—Gerald A. Michalsky
Attorney, Agent, or Firm—Oblon, Spivak, McClelland, Maier & Neustadt

[57] ABSTRACT

A manifold valve has a larger valve port, through which a spool slides, than conventional relative to the size of the valve body. When the size of the valve port is fixed, the size of the entire valve can be made smaller. The walls on both sides of the valve port have no holes to pass bolts to fasten the valve body to a manifold base etc. The side walls are at least made thinner than the walls having bolt holes, within the limit in which the strength to withstand the pressure of the fluid passing therethrough remains unimpaired. The valve is fastened to the valve mounting surface of the manifold base etc. by clamping at its front and rear ends.

20 Claims, 8 Drawing Sheets

MANIFOLD VALVE

This application is a continuation of application Ser. No. 07/813,687, filed on Dec. 27, 1991, now abandoned.

FIELD OF THE INVENTION

This invention relates to a manifold valve comprising a changeover valve attachable to a sub-soleplate or a manifold base.

DESCRIPTION OF THE PRIOR ART

Figure 1:
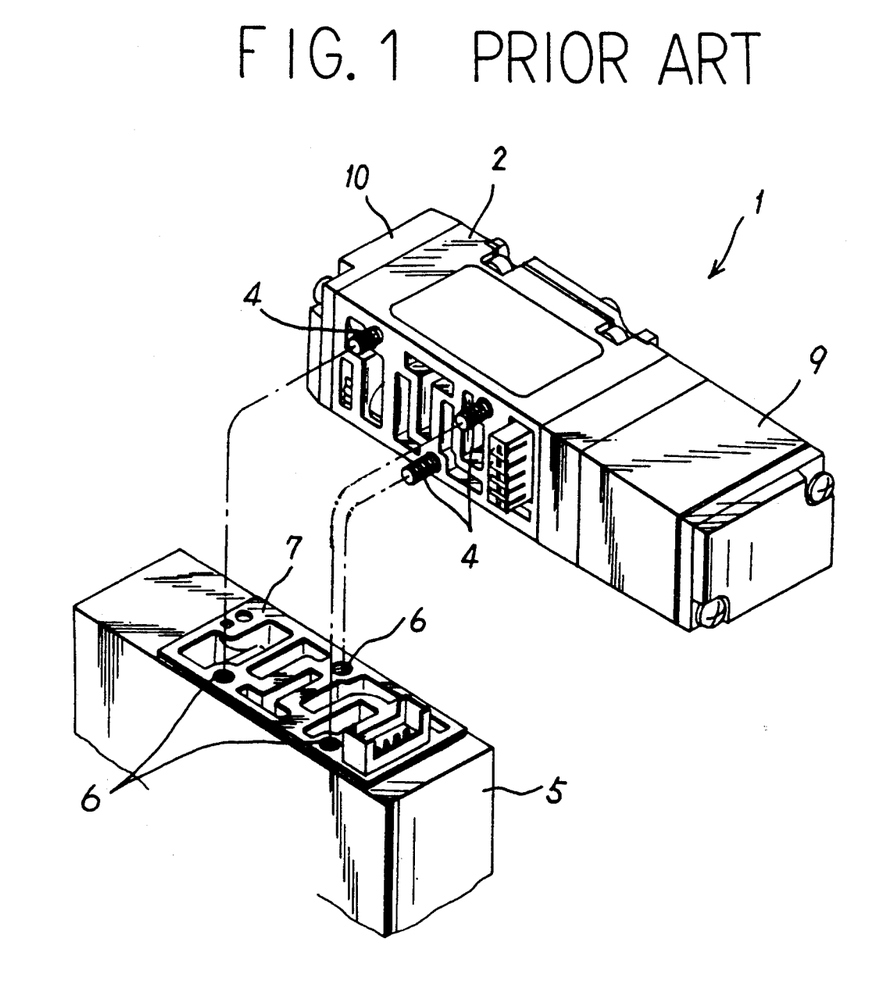
FIG. 1 is a perspective view showing how a conventional valve is fastened to a conventional manifold base.

A conventional manifold valve usually comprises, as shown in FIG. 1, a changeover valve 1 that is attached to a manifold base 5 etc. by means of bolts 4 that are screwed into tapped holes 6 in the manifold base 5 through holes 3 provided along both sides of a valve body 2.

To permit a sealing member 7 interposed between the valve 1 and manifold base 5 to function properly, the valve 1 is usually attached with two to four bolts 4. (Three bolts are used in the example shown in FIG. 1).

Figure 2:
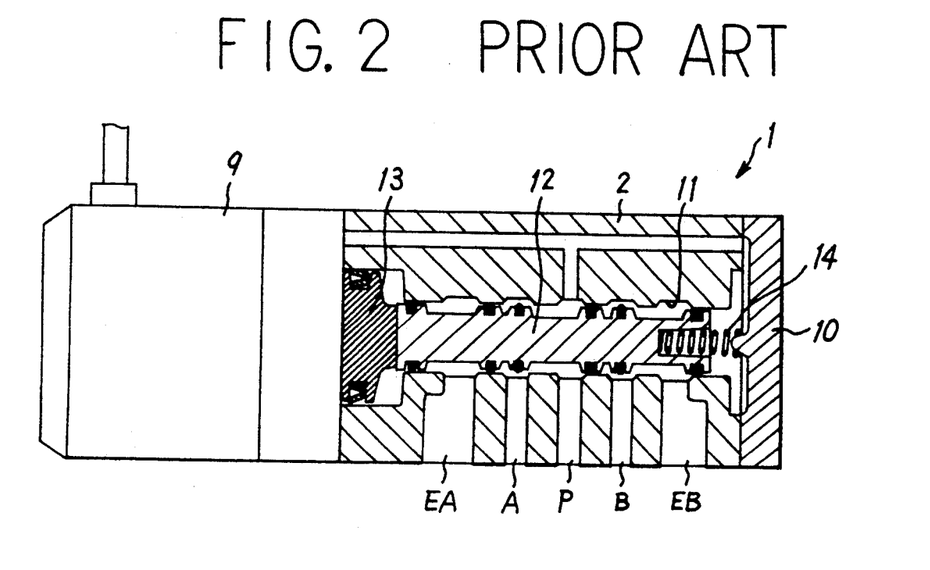
FIG. 2 is a longitudinal cross-sectional view of the same valve.
Figure 3:
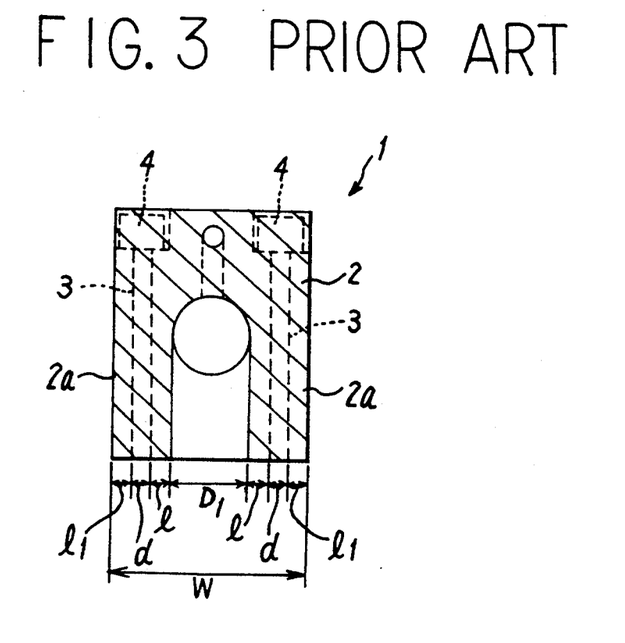
FIG. 3 is a transverse cross-sectional view of the same valve.

FIGS. 2 and 3 shown an example of the changeover valve 1 just described. The valve body 2 has an inlet port P to feed a pressurized fluid, such as compressed air, outlet ports A and B, exhaust ports EA and EB, and an axial valve port 11 to provide communication therebetween, with a pilot solenoid valve 9 and a cover 10 attached to both ends thereof by appropriate means. A spool 12 sliding through the valve port 11 switchingly establishes communication between the port P and the ports A and B and between the ports A and B and the ports EA and EB, depending on the driving force of a piston 13 on which the pilot fluid pressure supplied through the pilot solenoid valve 9 works and the force applied by a coil spring 14 interposed between the spool 12 and the cover 10.

As is obvious from FIG. 3, the bolt holes 3 provided along both sides of the valve body 2 increase the thickness of the side wall 2a on both sides of the valve port 11, which, in turn, limits the effective cross-sectional area of the fluid passage (valve port 11) that governs the basic performance of the valve 1.

Though this problem can be solved by increasing the width W of the valve body 2, this solution creates a new problem by increasing the size and weight of the valve 1.

Recently many valves are often mounted on a manifold base to permit their integral control. In such plural mounting, larger valves necessitating a longer manifold base are at a disadvantage.

Furthermore, the use of bolts 4 is not only inefficient as their fastening and unfastening take time but also lowers the reliability of mounting when they are not adequately tightened.

SUMMARY OF THE INVENTION

A primary object of this invention is to provide a manifold valve that has a valve port of larger diameter for its valve body and is available in a smaller size than conventional while maintaining the size of the fluid passage unreduced.

Another object of this invention is to provide a valve having a valve port of larger diameter for its valve body that is obtained by reducing the thickness of the walls on both sides of the valve port within the limit in which the strength to withstand the pressure of the fluid flowing through the valve remains uninjured.

Still another object of this invention is to provide a manifold valve that permits increasing the diameter of the valve port by means of a valve body that can be fastened to manifold base by clamping at the front and rear ends thereof, thereby eliminating the need for the use of bolts.

Yet another object of this invention is to provide a valve that permits reducing the axial length of the valve by means of said valve port of larger diameter that permits the same amount of the pressurized fluid to flow with a shorter stroke of the spool.

A further object of this invention is to provide a manifold valve that can be securely fastened to a manifold base with high efficiency and great ease by eliminating the use of inefficient and unreliable bolts.

A still further object of this invention is to provide a manifold valve that has a control mechanism for valve attachment and detachment in front thereof that affords a greater ease in operation and a greater reliability in fastening.

Yet another object of this invention is to provide a manifold valve that keeps the valve locked in position by means of a locking fastener and a control bolt, thereby facilitating the attachment and detachment thereof.

A still another object of this invention is to provide a manifold valve that permits making an electric connection for power supply from the manifold base to a valve simultaneously with the attachment of the valve to a manifold base.

To achieve the above objects, a manifold valve according to this invention essentially comprises a valve that is designed to be used with a sub-soleplate or a manifold base that has openings to correspond to the individual ports in the valve. The valve body has a valve port in which a spool to switch passages of a pressurized fluid is slidably inserted. The walls on both sides of the valve port have no holes to pass bolts for fastening the valve body to the manifold base etc. The side walls are at least made thinner than in a valve having bolt holes, within the limit in which the strength thereof is high enough to withstand the pressure of a pressurized fluid flowing through the valve.

Also, the walls on both sides of the valve port can be at least made thinner by the design margin that has conventionally been added to permit the provision of bolt holes.

In the manifold valve just described, the thickness of the walls on both sides of the valve port need not be larger than the width required for providing an adequate sealing between the surface thereof perforated with ports and the manifold base when the ports are formed by extending the lines tangential to the inner surface of both side walls substantially parallel to each other.

All this permits increasing the diameter of the valve port and the effective cross-sectional area of the fluid passage without increasing the width of the valve body, or reducing the width of the valve body without increasing the effective cross-sectional area of the fluid passage, thereby reducing the size and weight of the entire valve.

As a result of the width reduction, the valve body can be fastened to the valve mounting surface of the sub-soleplate or manifold base by clamping at the front and rear end thereof.

To permit this installation, it is preferable for the sub-soleplate or manifold base to have a clamp at the front end of the valve mounting surface thereon, a lock switchable between the locking and releasing positions at the rear end thereof and a device for switching the position of the lock from the front end of the valve mounting surface, and the valve to be mounted thereon to have a pair of recesses to engage with the clamp and the lock in the locking position.

To be more specific, the device for switching the position of the lock from the front end of the valve mounting surface comprises a control bolt, a cam moved by the control bolt, a lock lever to transmit the motion of the cam to the lock, and a clamp that is fastened by means of the control bolt meshing with the cam.

After switching the lock into the releasing position by turning the control bolt, the valve is placed on the mounting surface of the manifold base, with one recess therein engaged with the clamp. Then, the lock switched into the locking position clamps the valve on the mounting surface. Thus, the valve is fastened and released by means of the control bolt provided at the front end of the manifold base. This assures easier operation and steadier installation, with higher efficiency and greater reliability, then conventional fastening with bolts.

Furthermore, a power supplying socket may be provided at the rear end of the valve mounting surface of the manifold base and a power receiving socket on the valve, each socket having a guide surface to establish a contact between the two sockets when the valve is fastened to the manifold base. Thus, the contacting guide surfaces on the power supply and receiving sockets establish an electric connection therebetween simultaneously with the fastening of the valve to the manifold base.

DESCRIPTION OF THE PREFERRED EMBODIMENTS

Figure 4:
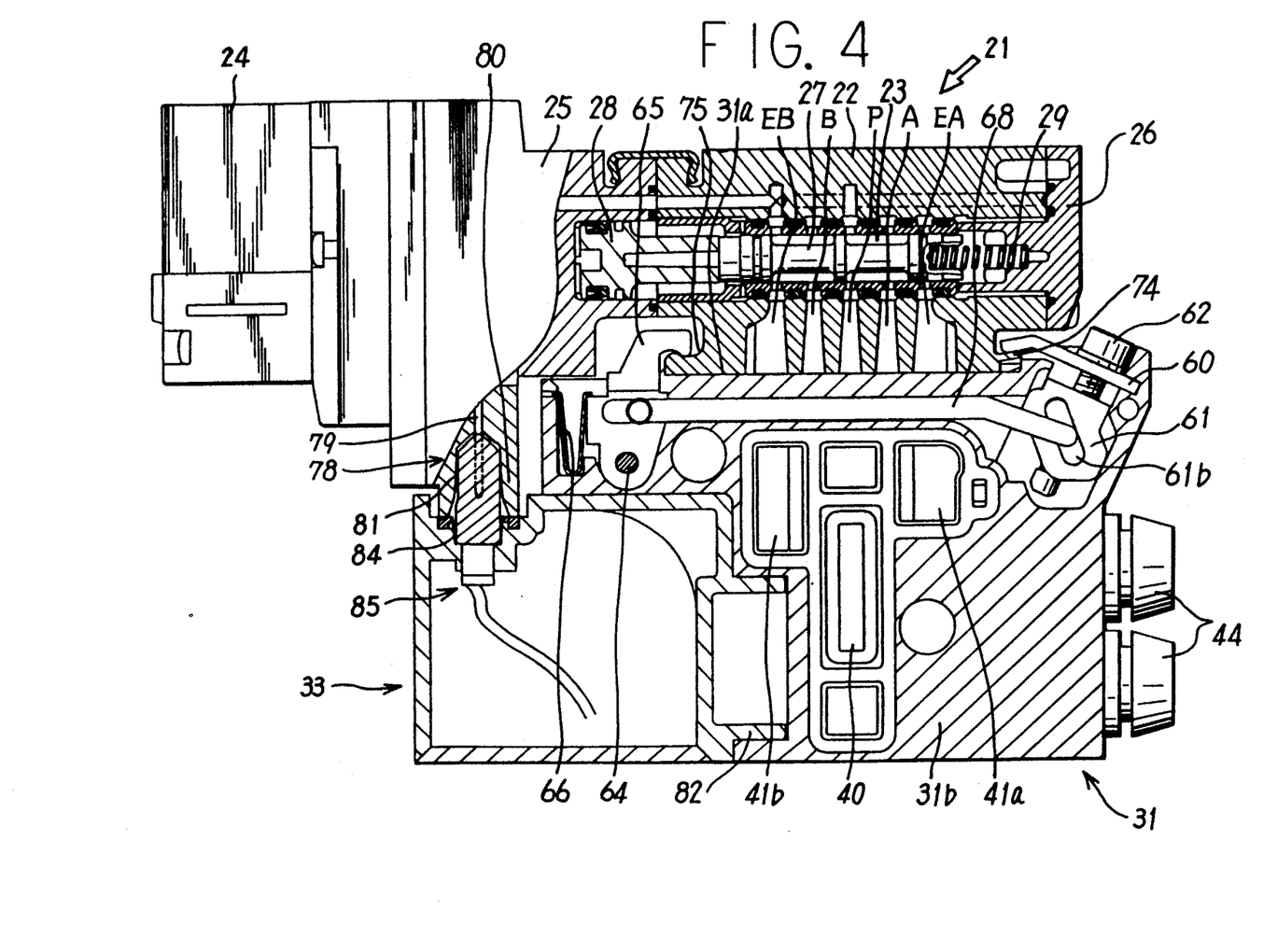
FIG. 4 is a longitudinal cross-sectional view showing the principal parts of a preferred embodiment of this invention, with a pilot solenoid valve mounted on a manifold base.

In a preferred embodiment of this invention shown in FIG. 4, a valve 21 is a five-port valve with a fluid passage switching function that is essentially analogous to the valve 1 shown in FIGS. 1 to 3.

The valve body 22 of the valve 21 has a port P to supply a pressurized fluid, such as compressed air, outlet ports A and B, exhaust ports EA and EB, and an axial valve port 23 to communicate the individual ports, with one end thereof connected to a pilot solenoid valve 24 through an adapter 25 and the other end thereof closed with a cover 26. A spool 27 slides in the valve port 23 between a position to bring ports P and A and ports B and EB into communication and a position to bring ports P and B and ports A and EA into communication, depending on the driving force of a piston 28 on which the pilot fluid pressure supplied through the pilot solenoid valve 24 works and the force applied by a coil spring 29 interposed between the spool 27 and the cover 26.

This invention is not limited to the preferred embodiment just described, but can be embodied in other types of valves so long as they have a plurality of ports and are attachable to a manifold base or the like.

Figure 5:
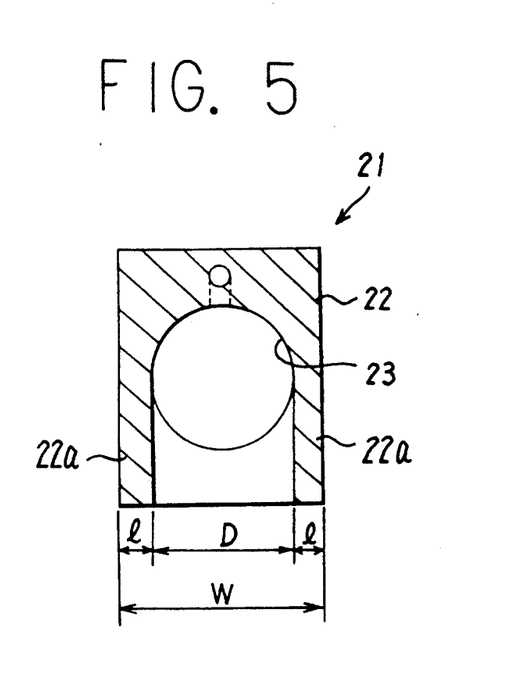
FIG. 5 illustrates the size of a valve port in a valve according to this invention.
Figure 6:
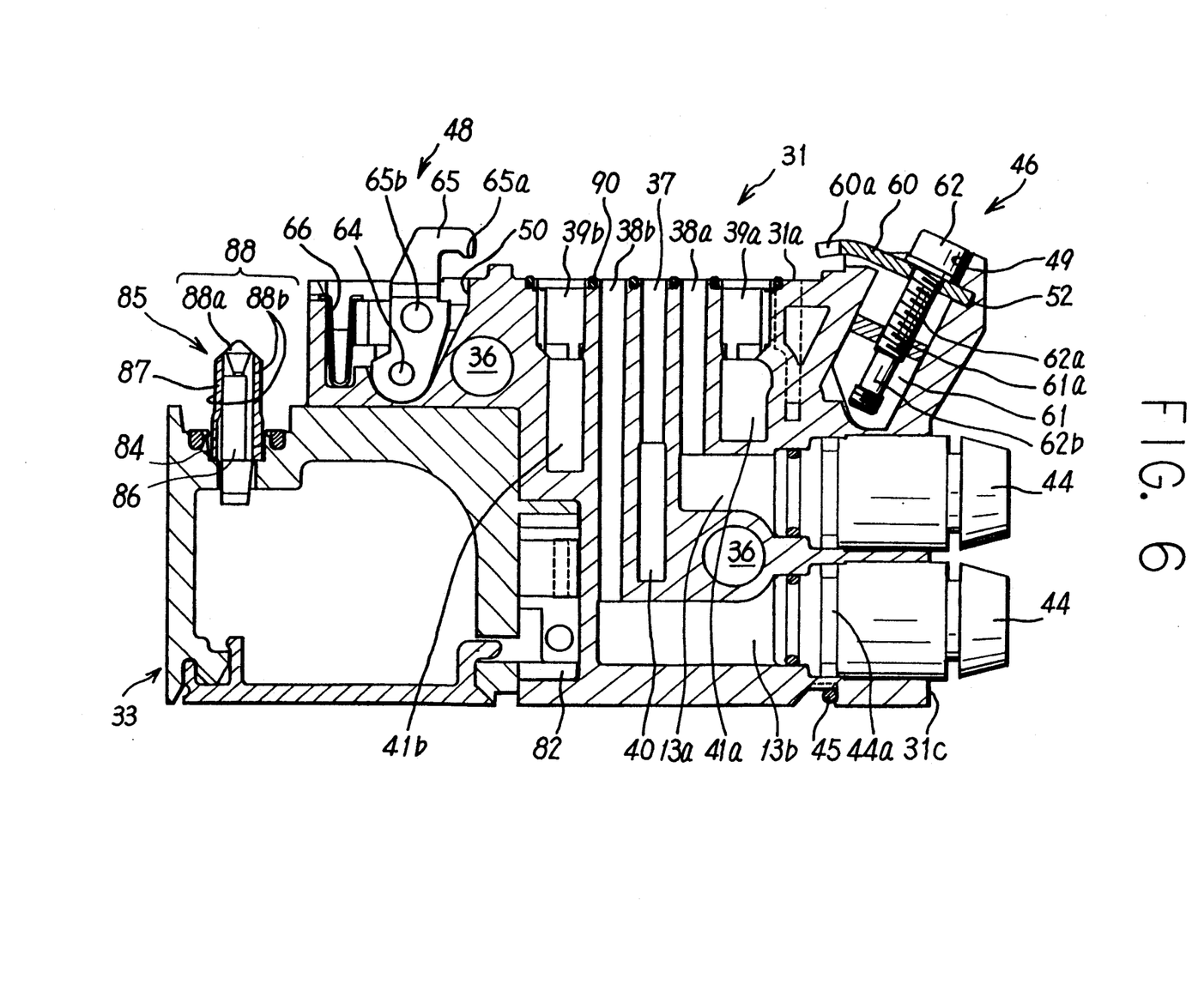
FIG. 6 is a longitudinal cross-sectional view of a manifold base according to this invention.

The valve body 22 of the valve 21 has no bolt holes to pass fastening bolts, as shown in FIG. 5. The thickness of the walls 22a on both sides of the valve port 23 extending in the axial direction of the spool 27 is reduced to a minimum, or a value close thereto, within the limit in which the strength to withstand the pressure of compressed air or other fluid passing through the valve body 22 remains unimpaired. To be more specific, the side walls 22a are at least made thinner than in a valve having bolt holes, or by the design margin that has conventionally been added to permit the provision of bolt holes, within the limit described above.

The side walls 22a may have a thickness to meet the following requirement, but, even then, the thickness thereof can be made thinner than in a valve having bolt holes.

When the individual ports in a die-cast valve body 22 are formed by extending the lines tangential to the inner surface of the side walls 22a substantially parallel to each other, the thickness of the side walls 22a is also limited by the width required for providing an adequate sealing between a surface of the valve body perforated with the ports and a manifold base. The width required for sealing, which varies with coefficients representing the properties of the sealing material, the pressure of the fluid, the fastening pressure applied on the sealed surfaces and other factors, depends on the service conditions of the valve.

As there is no bolt holes in the walls 22a on both sides of the valve port 23, the effective cross-sectional area of the fluid passage can be increased by increasing the diameter of the valve port 23, or the size of the valve 21 can be reduced by reducing the width of the valve body 22. The following paragraphs describe how the diameter of the valve port can be increased or the size of the valve body reduced in the valve body 22 shown in FIG. 5 whose width is equal to the width W of the conventional valve body 2 shown in FIG. 3.

When the valve port 23 in the valve body 22 has a diameter D and a cross-sectional area S, the side walls 22a have a thickness l large enough to withstand the pressure of the fluid flowing therethrough, whereas the valve port 11 in the valve body 2 has a diameter $D_1$, a cross-sectional area $S_1$, the bolt holes 3 have a diameter d, the side walls 2a have a thickness l large enough to withstand the pressure of the fluid flowing therethrough and a thickness $l_1$ large enough to permit the fastening with bolts 4, an increment $\Delta S$ in the cross-sectional area of the valve port 23 is expressed as $$\Delta S = S - S_1 = \pi/4(D^2 - D_1^2)$$

If $D_1 = D - 2(l_1 + d)$, $$\Delta S = \pi(D - l_1 - d)(l_1 + d)$$

If the valve ports 23 and 11 have the same diameter, the width of the valve body 22 can be made smaller than that of the valve body 2 by $2(l_1 + d)$.

When, for example, the diameter D of the valve port is 20 mm, the diameter d of the bolt holes is 3.5 mm and the thickness $l_1$ of the side wall to permit bolt fastening is 1.5 mm, the effective cross-sectional area of the fluid passage increases by 235.5 mm².

As the cross-sectional area S of the valve port 23 is 314 mm², the rate of increase is expressed as $$S/S_1 = S/(S - \Delta S) \approx 4$$

Thus, if the valve ports 23 and 11 have the same diameter, the width of the valve body 22 can be made thinner than that of the valve body 2 by approximately 10 mm.

This results in a fluid passage having a larger cross-sectional area to permit the flow of a large amount of pressurized fluid, which, in turn, permits reducing the stroke of the spool and, therefore, the axial length of the valve body 22.

When the effective cross-sectional area of the fluid passage is kept unchanged, a reduction in the width of the valve body 22 leads to a reduction in the size and weight of the valve 21.

Referring now to FIGS. 4 and 6 to 8, the construction of a manifold base 31 and a fastening mechanism to hold the valve 21 in position will be described in the following.

The valve 21 is made thinner by reducing the thickness of the valve body 22 by reducing the thickness of the walls 22a on both sides of the valve port 23 within the limit in which the strength to withstand the pressure of the fluid passing therethrough remains unimpaired. As this leaves no space to insert bolts for fastening the valve body to the manifold base, the valve body is fastened to the manifold base by clamping at the front and rear ends thereof.

Figure 7:
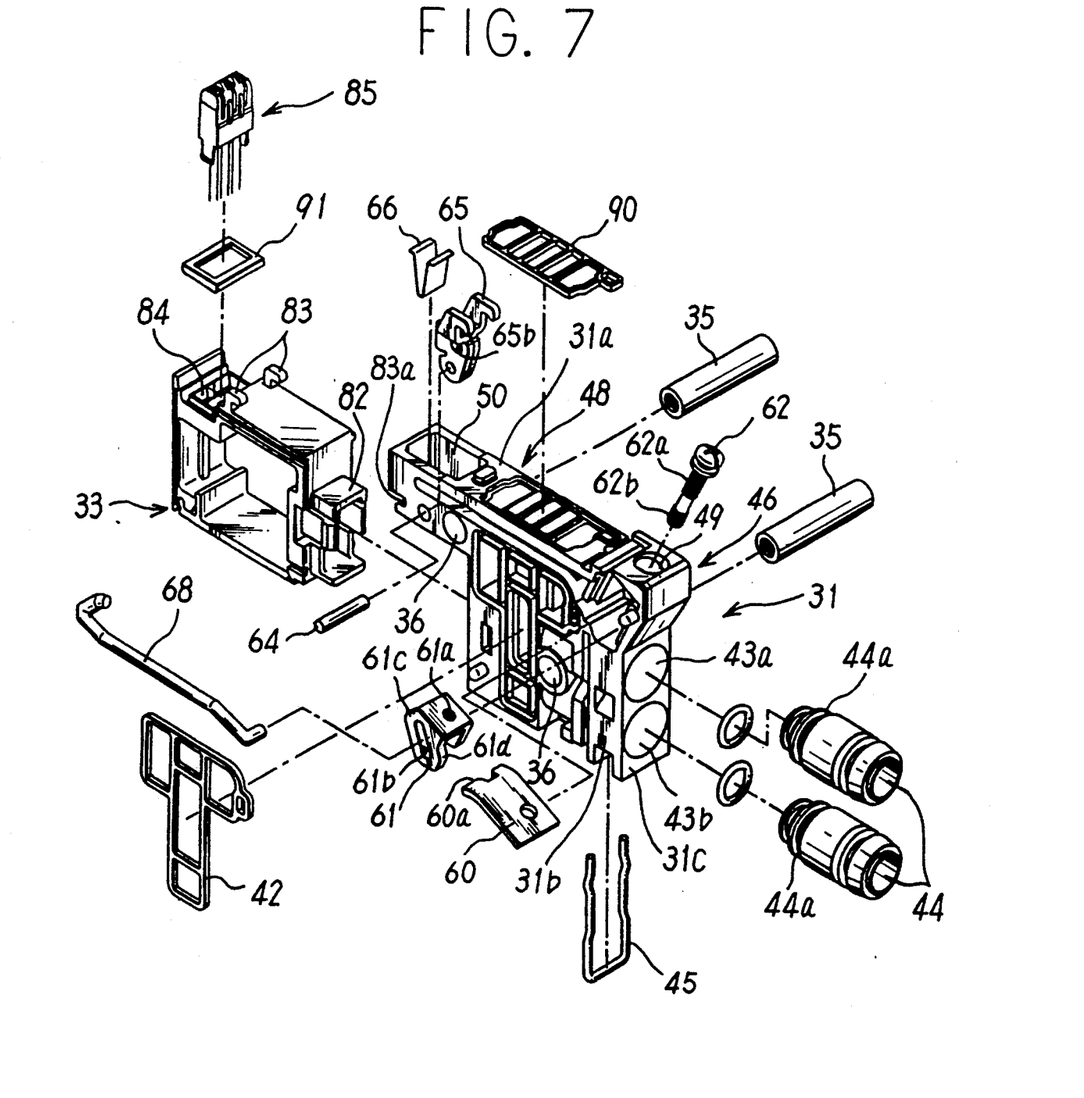
FIG. 7 is an exploded perspective view of a manifold base according to this invention.
Figure 8:
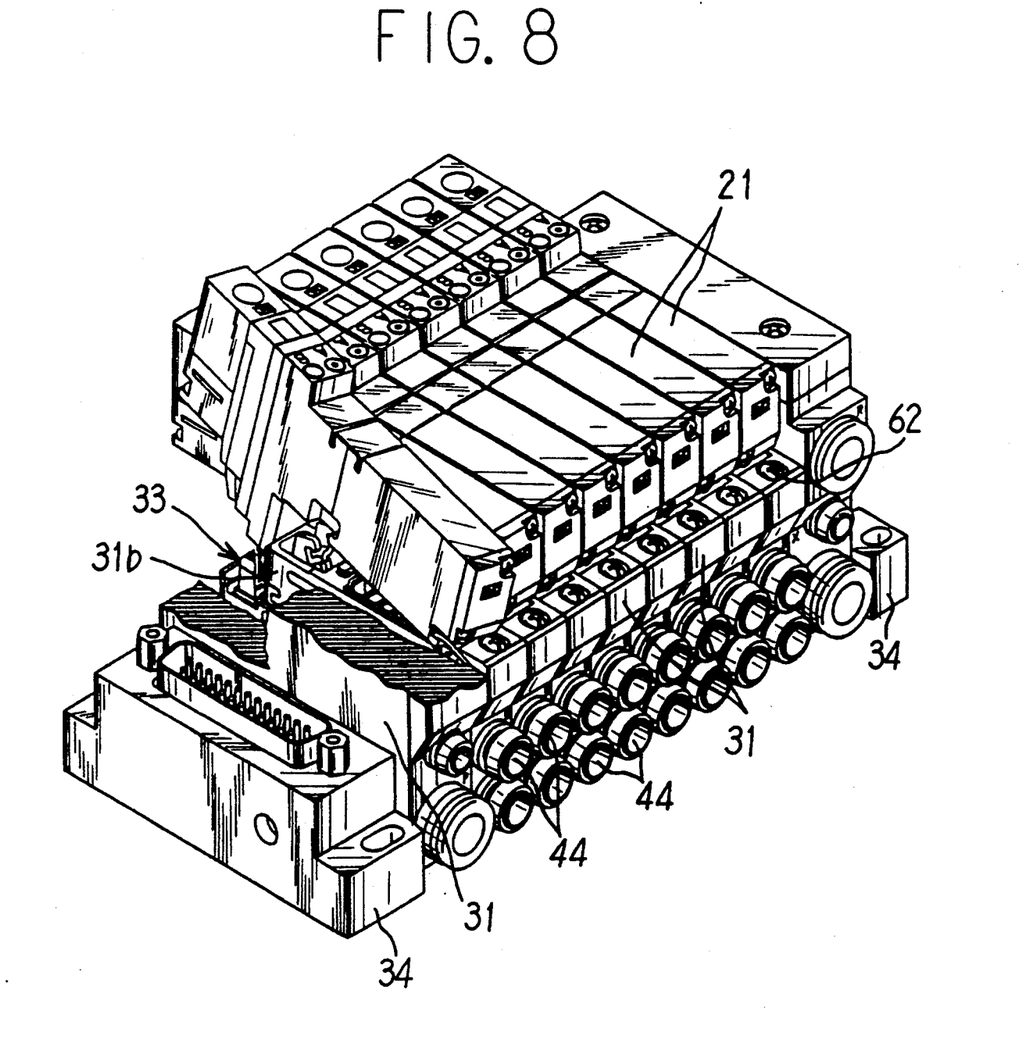
FIG. 8 is an overall perspective view of a manifold valve according to this invention, with a part thereof cut open.

The manifold valve being discussed comprises a manifold base 31, a valve 21 to be attached to a mounting surface 31a of the manifold base 31, and a power supply box 33 attached to the rear end of the manifold base 31. As shown in FIG. 8, a desired number of manifold bases 31 are joined together, with the contact surfaces 31b on both sides thereof kept in contact with each other and an end plate 34 placed at each end of the group of manifold bases 31. The manifold bases 31 are integrally joined together by means of a tie rod 35 passed through a plurality of rod holes 35, as shown in FIG. 7.

An inlet duct 37, outlet ducts 38a and 38b, and exhaust ducts 39a and 39b, through which compressed air or other pressurized fluid passes, open in a valve mounting surface 31a of the manifold base 31. The inlet duct 37 and the exhaust ducts 39a and 39b individually communicate with a supply passage 40 and exhaust passages 41a and 41b that pass through in the direction in which the manifold bases 31 are joined together. The individual passages are sealed by a gasket 42 disposed between the adjoining contact surfaces 31b. The outlet ducts 38a and 38b individually communicate with outlets 43a and 43b provided in the front end surface 31c of the manifold base 31, with a one-touch pipe joint 44 attached to each of the outlets 43a and 43b by means of a fastening spring 45. Elastically fitted in a groove 44a cut around the one-touch pipe joint 44, the fastening spring 45 keeps the pipe joint 44 in position in a bore provided in the manifold base 31.

The manifold base 31 just described has an insert hole 49 that opens diagonally forward to hold a control bolt 62 to be described later in a front end engaging mechanism 46 at the front end of the valve mounting surface 31a. On the inner side, the insert hole 49 opens into the contact surfaces 31b of the individual manifold bases. A rear end engaging mechanism 48 at the rear end of the valve mounting surface 31a has a recess 50 that opens upward.

The insert hole 49 in the front end engaging mechanism 46 has a groove 52 cut around the wall thereof, and a metal clamp 60 has a base end fit in the groove 52 and a front hook 60a projecting above the valve mounting surface 31a. The control bolt 62 is loosely fitted in the metal clamp 60, with a threaded part 62a thereof screwed into a threaded hole 61a in a cam 61 fitted in the insert hole 49 in the front end engaging mechanism 46. The control bolt 62 has a thread-less thinner part 62b at the forward end of the threaded part 62a screwed into the threaded hole 61a in the cam 61. When the thinner part 62b is inside the threaded hole 61a in the cam 61, the control bolt 62 is slidable with respect to the metal clamp 60 and cam 61. The cam 61 also has engaging shoulders 61c and 61d to engage with engaging corners 54 and 55 in the front and rear walls in the insert hole 49 and a cam groove 61b to transmit the motion thereof to the rear end engaging mechanism 48.

The rear end engaging mechanism 48 has a metal lock 65 that is swingably fitted in the recess 50 with a pin 64. The metal lock 65 has a hook 65a projecting above the valve mounting surface 31a of the manifold base and is always urged toward the locking position by a spring 66.

One of the contact surfaces 31b of the manifold base 31 has a groove 48 that extends between the front end engaging mechanism 46 and the rear end engaging mechanism 48, with a lock lever 68 slidably fitted therein. While the front bent end of the lock lever 68 engages with the cam groove 61b, the rear bent end thereof engages with a hole 65b in the metal lock 65. Thus, the control bolt 62 moves the metal lock 65 through the cam 61 and lock lever 68.

The valve body 22 has engaging recesses 74 and 75 to engage with the hooks 60a and 65a on the metal clamp 60 and metal lock 65. The engagement of the hooks 60a and 65a puts the valve 21 in a given position on the valve mounting surface 31a of the manifold base 31, thereby individually bringing the corresponding openings into communication with each other.

A power receiving socket 78 to supply electric power to the solenoid of the pilot solenoid valve 24 is attached to the adapter 25 between the pilot solenoid valve 24 and valve body 22. The power receiving socket 78 has a plurality of power receiving pins 79 extending downward and a guide 80 that surround the periphery thereof. On the inside of the guide 80 is provided a tapered guide surface 81 that opens flaringly.

The power supply box 33 to supply electric power to the power receiving socket 78 has a projection 82 fitted into the manifold base 31 and an engaging claw 83 that elastically engages with an engaging recess 83a in the manifold base 31. The power supply box 33 is attached to the manifold base 31 by means of the projection 82 and claw 83. The power supply box 33 has an opening 84 that is provided in a position opposite to the power receiving socket 78 mounted thereon, with a power supply plug 85 having a required number of power supply terminals 86 and an enclosing tapered guide surface 87 attached thereto.

Reference numerals 90 and 91 in the figure designate gaskets attached to the valve mounting surface 31a and opening 84.

Figure 9:
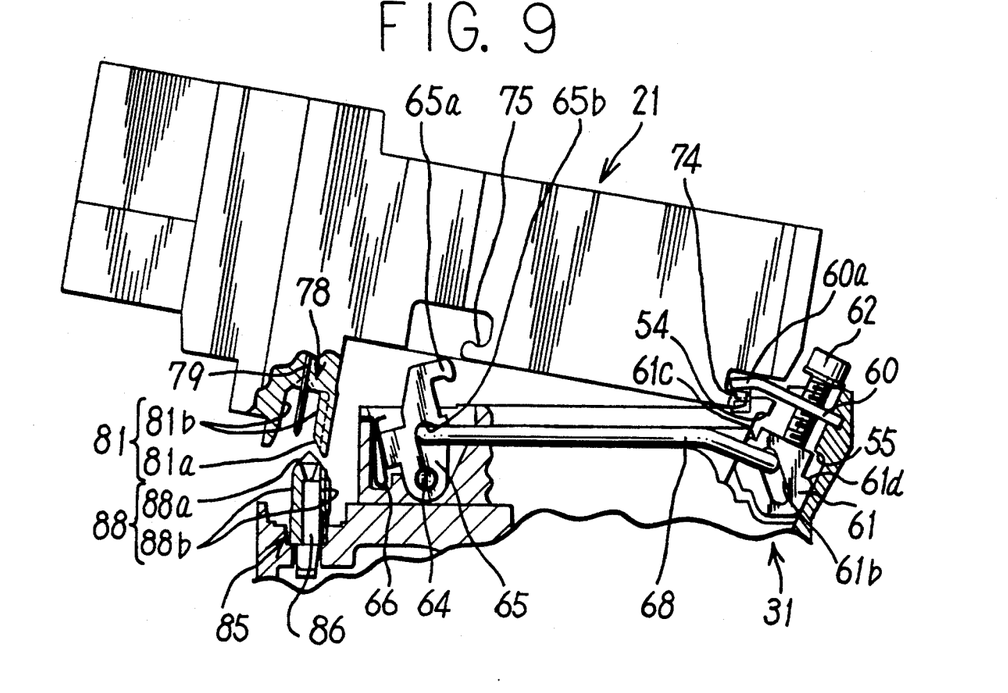
FIGS. 9 and 10 illustrate how a valve according to this invention is fastened to a manifold base.
Figure 10:
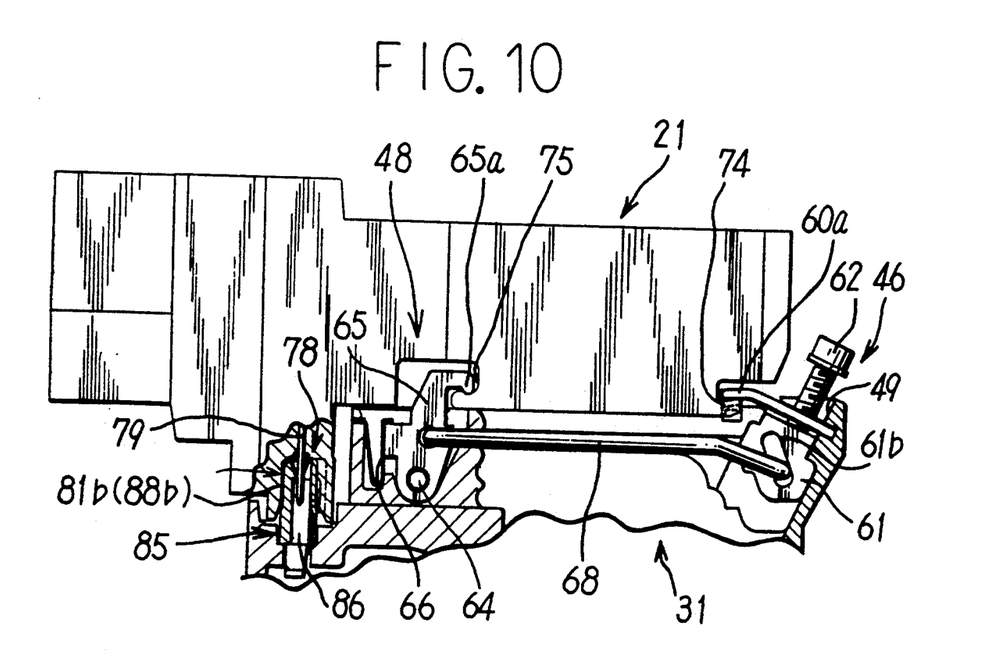

Referring now to FIGS. 9 and 10, steps of mounting of the valve 21 onto the valve mounting surface 31a of the manifold base 31 and dismounting therefrom will be described.

When the control bolt 62 is pushed into the insert hole 49 while the metal lock 65 is urged toward the locking position by the spring 66, the cam 61 descends as shown in FIG. 9. As the cam groove 61b then presses the lock lever 68, the metal lock 65 swings to the releasing position against the urging force of the spring 66. When the valve 21 is tilted as shown in FIG. 9 to bring the engaging recess 74 into engagement with the hook 60a, the valve 21 is placed on the valve mounting surface 31a and the control bolt 62 is released, the hook 65a on the metal lock 65 engages with the engaging recess 75 on the valve 21 to clamp the valve 21 on the valve mounting surface 31a.

At the same time, the power receiving socket 78 fits over the power supply plug 85, with the guide surfaces 81 and 88 thereon coming in contact with each other, thereby establishing an electric connection between the power receiving pints 79 and the power supply terminals 86.

When the control bolt 62 is turned to screw the threaded part 62a thereof into the threaded hole 61a in the cam 61 in this condition, the cam 61 is pulled up to bring the engaging shoulders 61c and 61d into engagement with the engaging corners 54 and 55 in the front and rear walls in the insert hole 49, thereby keeping the metal lock 65 in the locking position, as shown in FIG. 10.

To dismount the valve 21, the control bolt 62 is turned in the opposite direction to release the threaded part 62a thereof from the engagement with the threaded hole 61a. The subsequent pressing of the control bolt 62 lowers the cam 61, whereby the lock lever 68 brings the metal lock 65 into the releasing position and out of engagement with the engaging recess 75. Then, the valve 21 is removed from the manifold base 31 by pulling from the rear end thereof and disengaging the hook 60a from the engaging recess 74.

With the manifold valve just described, the valve 21 can be fastened to, and detached from, the manifold base 31 with ease by simply pressing and turning the control bolt 62 provided in the front end of the manifold base 31. The power supply 85 and the power receiving socket 78 are electrically connected as the guide surfaces 81 and 88 thereof are brought into contact with each other when the valve 21 is mounted on the valve mounting surface 31a from the tilted position.

What is claimed is:

1. A manifold valve used on a valve mounting surface of one of a sub-soleplate and a manifold base having openings corresponding to ports therein in which:
   (a) a valve port is provided in a valve body of the manifold valve to slidably accommodate a spool that switches passages of a pressurized fluid flowing therethrough;
   (b) walls on both sides of the valve port have no holes to pass bolts to fasten the valve body to the one of a sub-soleplate and a manifold base; and
   (c) means for connecting the valve body to the one of a sub-soleplate and a manifold base are provided without utilizing bolts on said both sides of the valve port such that said side walls can be made thinner as compared with walls having bolts holes, while the limit in which the strength to withstand the pressure of the fluid passing therethrough remains unimpaired, wherein the valve body is fastened to the valve mounting surface of the one of a sub-soleplate and a manifold base by clamping at the front and rear ends thereof; and
   wherein the one of a sub-soleplate and a manifold base has a metal clamp at a front end of the valve mounting surface thereof, a metal lock switchable between the locking and releasing positions at a rear end thereof, and means to switch the position of the metal lock by operation from the front end of the valve mounting surface, and the valve mounted on the valve mounting surface has a pair of engaging recesses to engage with the metal clamp and the metal lock in the locking position.

2. A manifold valve according to claim 1, in which the means for switching the position of the metal lock by operation from the front end of the valve mounting surface comprises a control bolt, a cam adapted to be moved by the control valve, a lock lever to transmit the motion of the cam to a metal lock, and a metal clamp that is fastened when the control bolt is screwed into the cam.

3. A manifold valve according to claim 1, in which a power supply plug is provided at a rear end of the valve mounting surface of the manifold base, a power receiving socket is provided on the valve body, with guide surfaces to bring the plug and socket into contact with each other when the valve body is attached to the manifold base.

4. A manifold valve used on a valve mounting surface of one of a sub-soleplate and a manifold base having openings corresponding to ports therein in which:
   (a) a valve port is provided in a valve body of the manifold valve to slidably accommodate a spool that switches passages of a pressurized fluid flowing therethrough;
   (b) walls on both sides of the valve port have no holes to pass bolts to fasten the valve body to the one of a sub-soleplate and a manifold base; and
   (c) means for connecting the valve body to the one of a sub-soleplate and a manifold base are provided without utilizing bolts on said both sides of the valve port such that said side walls can be made thinner as compared with walls having bolts holes, while the limit in which the strength to withstand the pressure of the fluid passing therethrough remains unimpaired;
   wherein said means for connecting includes a movable lock and a clamp, and means for moving said movable lock between lock and release positions, said means for moving including a control bolt associated with said clamp;
   the valve further including a cam and a lock lever connected between said control bolt and said movable lock, and wherein rotation of said control bolt causes movement of said lock by way of said cam and lock lever.

5. A manifold valve comprising:

(a) a valve body having a first valve body engaging mechanism and a second valve body engaging mechanism;

(b) a manifold base;

(c) a first lock mechanism engageable with said first valve body engaging mechanism;

(d) a second lock mechanism engageable with said second valve body engaging mechanism; and (e) a connecting member connecting said first lock mechanism and said second lock mechanism;

wherein said connecting member is a linkage mechanically coupling said first lock mechanism and said second lock mechanism such that said second lock mechanism is locked to said second valve body engaging mechanism via said connecting member upon operation of said first lock mechanism engaging said first valve body engaging mechanism.

6. A manifold valve according to claim 5, wherein said first lock mechanism includes a clamp for engaging with said first valve body engaging mechanism.

7. A manifold valve according to claim 6, wherein said first valve body engaging mechanism is a first recess defined at one end portion of said valve body and said clamp is engages with said first recess.

8. A manifold valve according to claim 7, wherein said clamp includes a hook member at a distal end thereof which is engageable with said first recess.

9. A manifold valve according to claim 7, wherein said second lock mechanism has a lock member for engaging with said second valve body engaging mechanism.

10. A manifold valve according to claim 9, wherein said second valve body engaging mechanism is a second recess defined at a second end portion of said valve body opposite of said first recess, and said lock member is engaged with said second recess.

11. A manifold valve according to claim 10, wherein said lock member includes a hook portion at one end thereof which is engageable with said second recess.

12. A manifold according to claim 11, further comprising a pin member mounted within said manifold base, wherein said lock member is swingably mounted about said pin member.

13. A manifold valve according to claim 12, wherein said lock member has a hole defined therein to receive the end of said connecting member proximate said lock member.

14. A manifold valve according to claim 11, wherein said lock member is biased to be engaged with said valve.

15. A manifold valve according to claim 5, wherein said first lock mechanism includes a fastening member to swingably move said connecting member.

16. A valve according to claim 15, wherein said first lock mechanism includes a cam member which receives said fastening member and engages one end of said connecting member.

17. A manifold valve according to claims 5, 6, 7, 8, 15 or 16, wherein one of said manifold base and said valve body has a male member and the other of said manifold base and said valve body has a female member, said members having respective guide elements profiled to cooperatively guide said members together and thereby align said valve body to said manifold base.

18. The manifold valve according to claim 17, wherein said female member is a power receiving socket for receiving power, and said male member is a power supply terminal for supplying power.

19. The manifold valve of claim 5, wherein said first lock mechanism includes a groove receiving a first end of said connecting member with said first end movable within said groove, wherein a second end of said connecting member is connected to said second lock mechanism, and wherein when said first end is in a first position relative to said groove said connecting member holds said second lock mechanism in a release position and further wherein when said first end is in a second position relative to said groove said second lock mechanism is locked to said second valve body engaging mechanism.

20. A system of manifold valves comprising:

a plurality of manifold valves, each of said manifold valves comprising:

(a) a valve body having a first valve body engaging mechanism and a second valve body engaging mechanism;

(b) a manifold base;

(c) a first lock mechanism engageable with said first valve body engaging mechanism;

(d) a second lock mechanism engageable with said second valve body engaging mechanism; and (e) a connecting member connecting said first lock mechanism and said second lock mechanism;

wherein said connecting member is a linkage mechanically coupling said first lock mechanism and said second lock mechanism such that said second lock mechanism is locked to said second valve body engaging mechanism via said connecting member upon operation of said first lock mechanism engaging said first valve body engaging mechanism.

* * * * *